United States Patent
Yamaguchi

[19]

[11] Patent Number: 6,112,531

[45] Date of Patent: Sep. 5, 2000

[54] SUPERCONDUCTING SYSTEM

[75] Inventor: Satarou Yamaguchi, Kasugai, Japan

[73] Assignee: Kabushikikaisya, YYL, Japan

[21] Appl. No.: 08/837,540

[22] Filed: Apr. 21, 1997

[30] Foreign Application Priority Data

Apr. 19, 1996 [JP] Japan .................................. 8-122184
Aug. 16, 1996 [JP] Japan .................................. 8-234717

[51] Int. Cl.[7] ............................ F25B 19/00; F25B 21/02;
H01F 6/04; H02G 15/34
[52] U.S. Cl. ............................ 62/51.1; 62/3.7; 174/15.5;
335/216; 505/700; 505/892
[58] Field of Search ............................. 62/3.7, 3.2, 51.1,
62/45.1, 481; 174/15.4, 15.5; 335/216;
505/700, 892

[56] References Cited

U.S. PATENT DOCUMENTS

| | | |
|---|---|---|
| 3,343,035 | 9/1967 | Garwin . |
| 3,959,576 | 5/1976 | Penczynski et al. .................... 174/15.4 |
| 5,347,251 | 9/1994 | Arrendale ................................ 335/216 |
| 5,353,000 | 10/1994 | Morris et al. ............................ 335/216 |
| 5,432,297 | 7/1995 | Dederer et al. ......................... 174/15.4 |
| 5,524,441 | 6/1996 | Herrmann et al. ....................... 62/51.1 |

FOREIGN PATENT DOCUMENTS

4223145A1  1/1994  Germany .

OTHER PUBLICATIONS

English Abstract for JP 9223071, filed Aug. 31, 1992, published Mar. 18, 1994 as JP 6057051A.
English Abstract for JP 9191894, filed Apr. 23, 1991, published Nov. 12, 1992 as JP 4322023A.
English Abstract for JP 90169887, filed Jun. 29, 1990, published Mar. 4, 1992, as JP 4069012A.
English Abstract for JP 90669880, filed Jun. 29, 1990, published Mar. 4, 1992 as JP 4069011A.
English Abstact for JP 90140022, filed May 31, 1990, published Feb. 27, 1992 as JP 4038119A.
English Abstract for JP 89176808, filed Jul. 6, 1989, published Feb. 20, 1991 as JP 3039690A.

Primary Examiner—William Doerrler
Attorney, Agent, or Firm—Majestic, Parsons, Siebert & Hsue P.C.

[57] ABSTRACT

A superconducting system having a coil or cable in the form of strands at superconducting temperature is connected to a power supply at room temperature. The connection is by means of a stranded current lead substantially under regular conducting conditions. Each current lead strand is insulated and connected to a corresponding superconducting strand so as to supply current and to contribute an individual series resistance. The temperature-sensitive resistance provides an important current self-limiting mechanism to forestall current imbalance or channeling among the superconducting strands and therefore forestall premature quenching. Various embodiments are directed to regulating the current in the individual superconducting strands, including regulating the resistance in the individual current lead strands with careful temperature control as well as improving the overall superconducting system with optimized cooling.

19 Claims, 13 Drawing Sheets

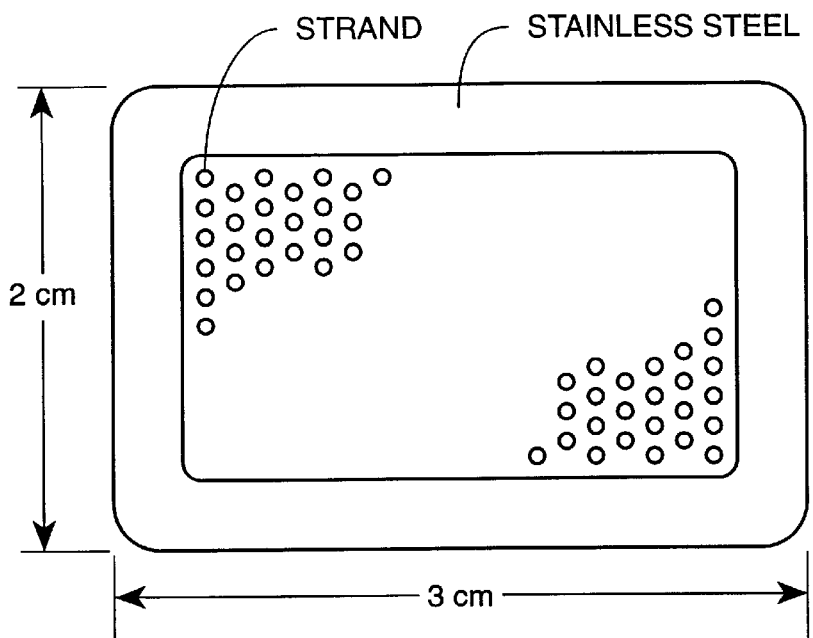
FIG._1
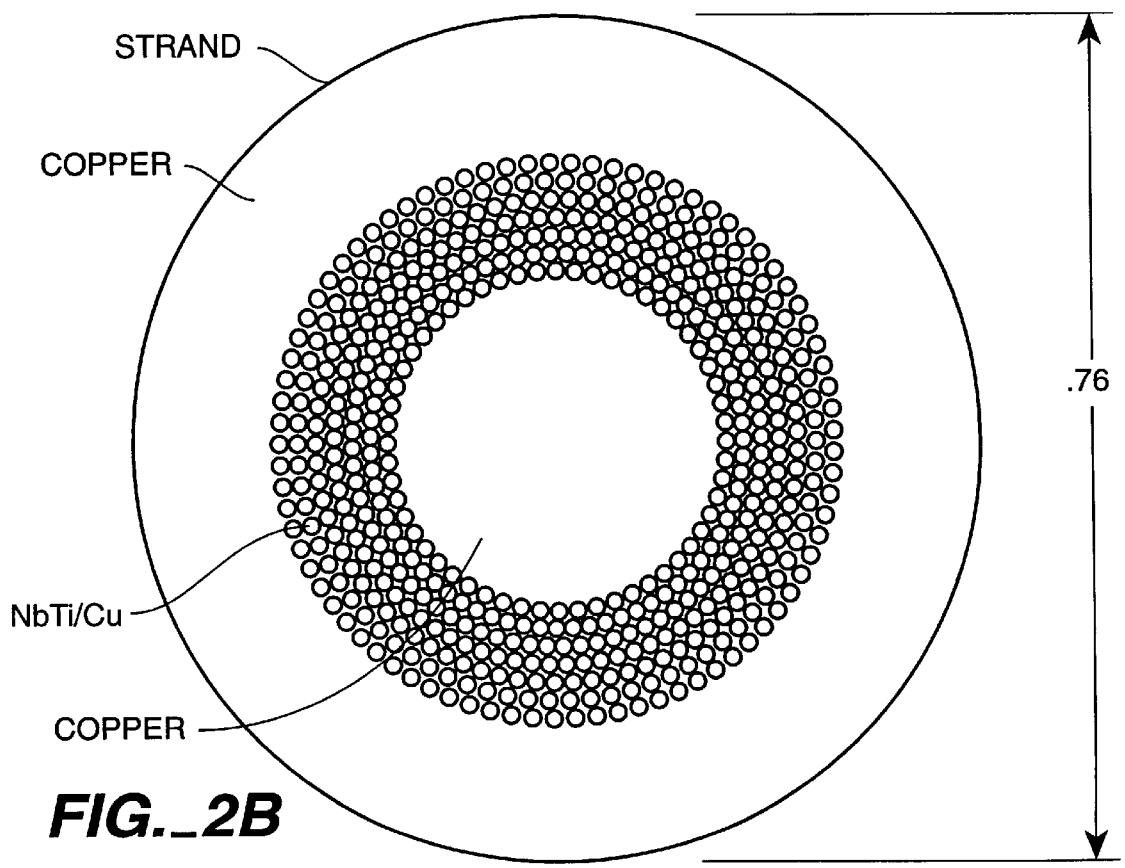
FIG._2B

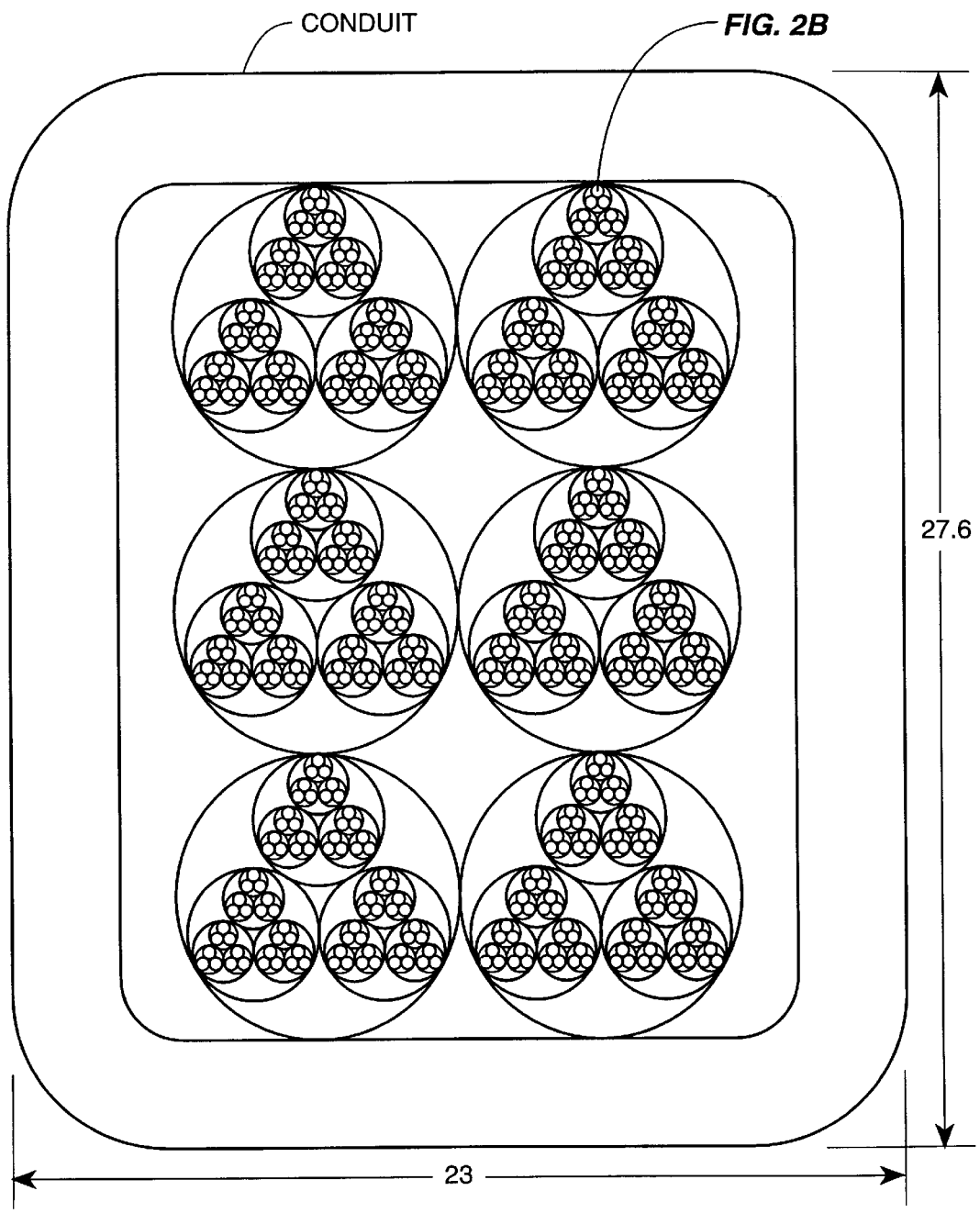
FIG._2A

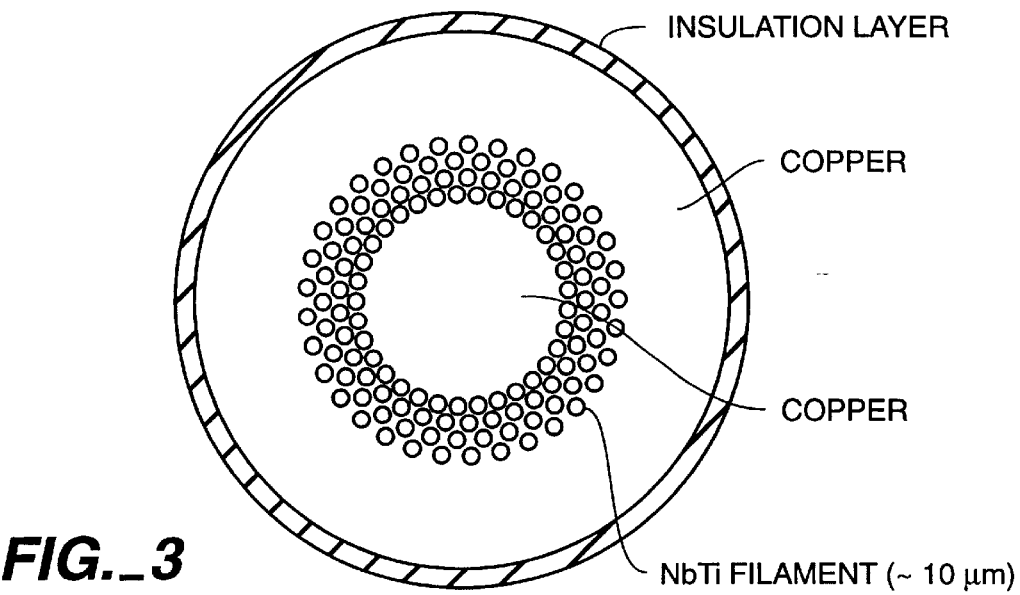
FIG._3
INSULATION LAYER
COPPER
COPPER
NbTi FILAMENT (~ 10 μm)
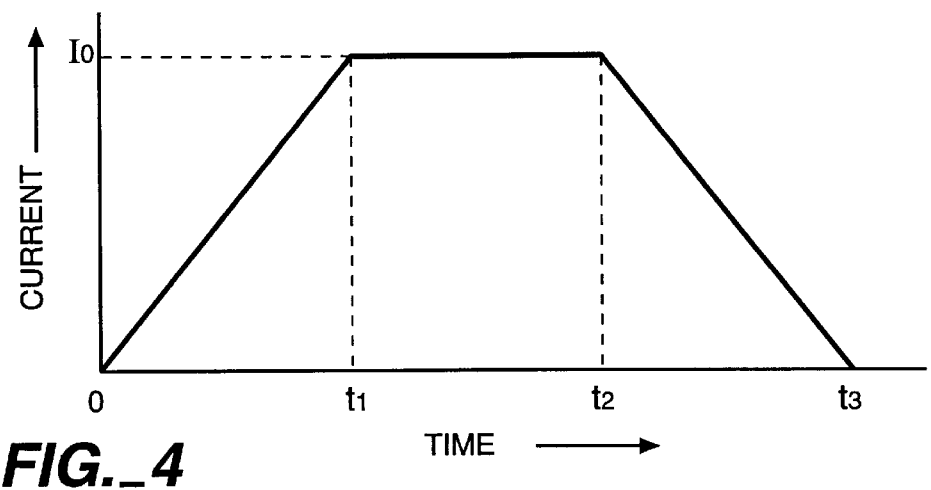
FIG._4
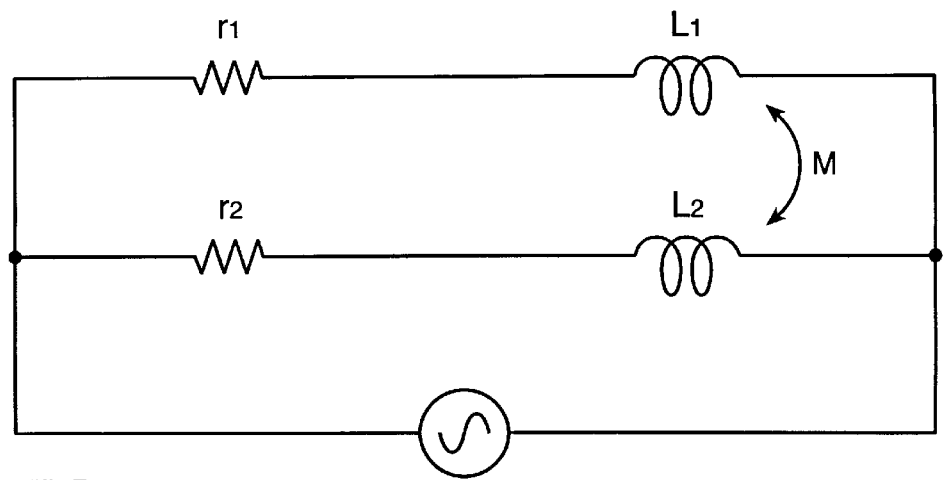
FIG._5 AC POWER SUPPLY

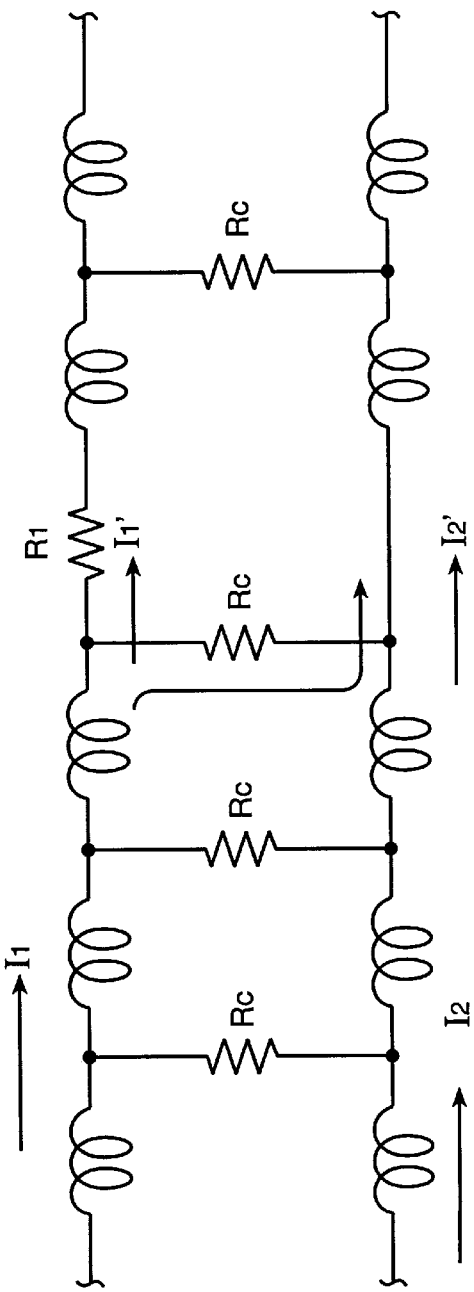
FIG._6
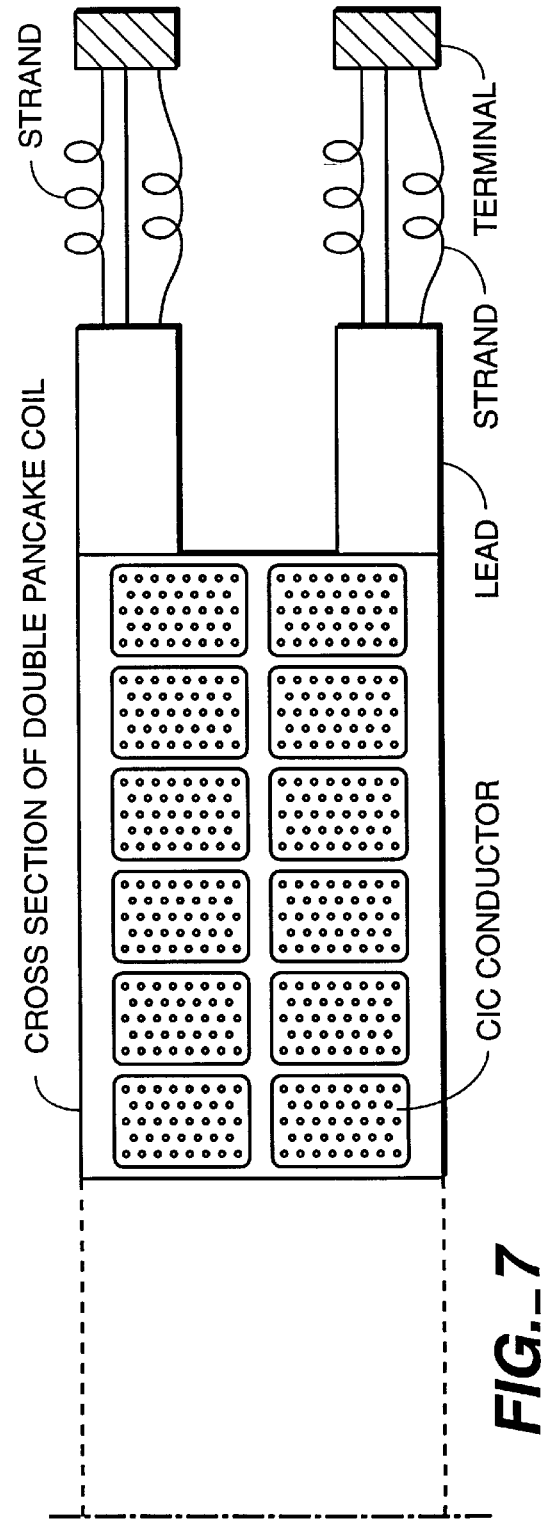
FIG._7

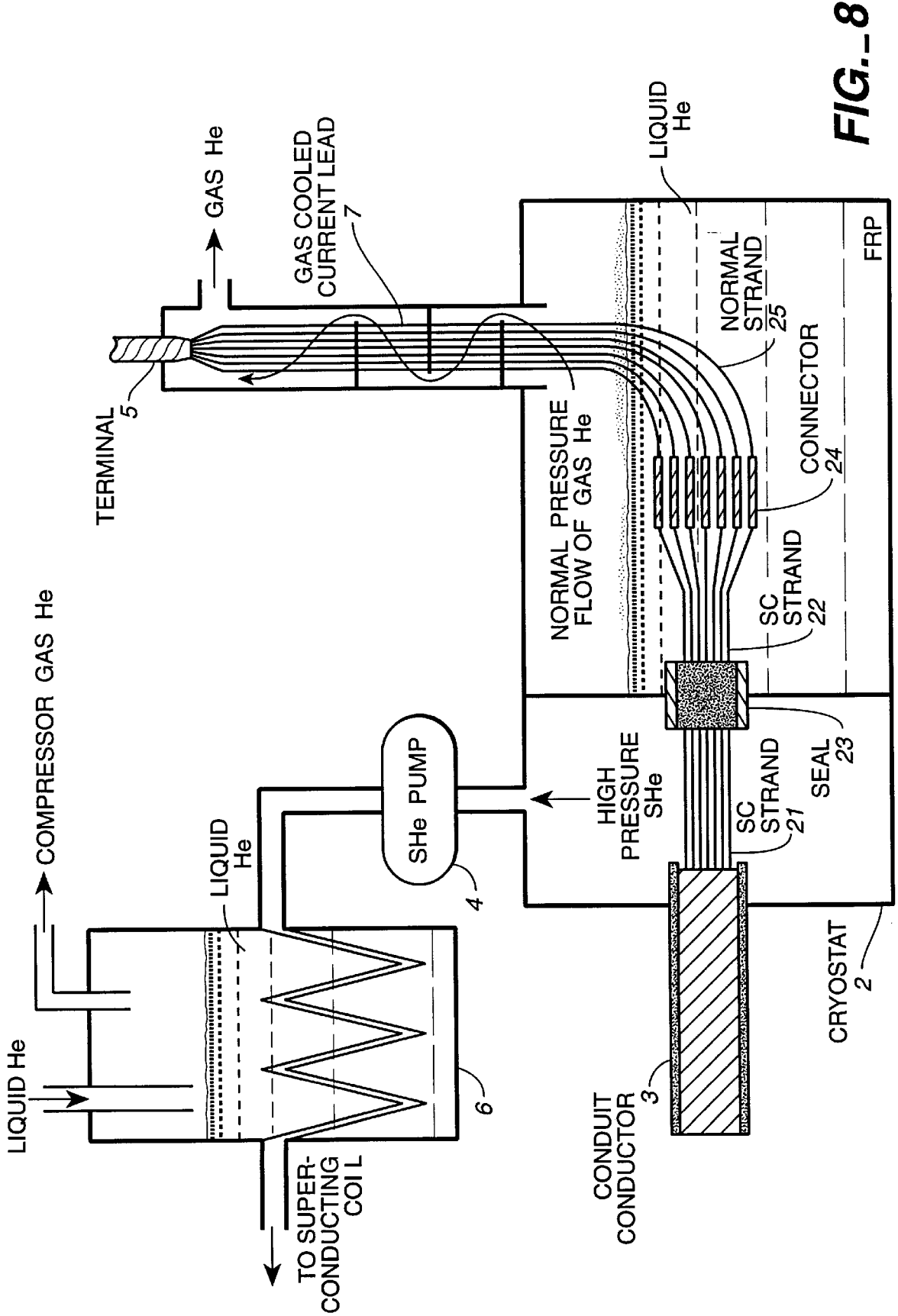
FIG._8

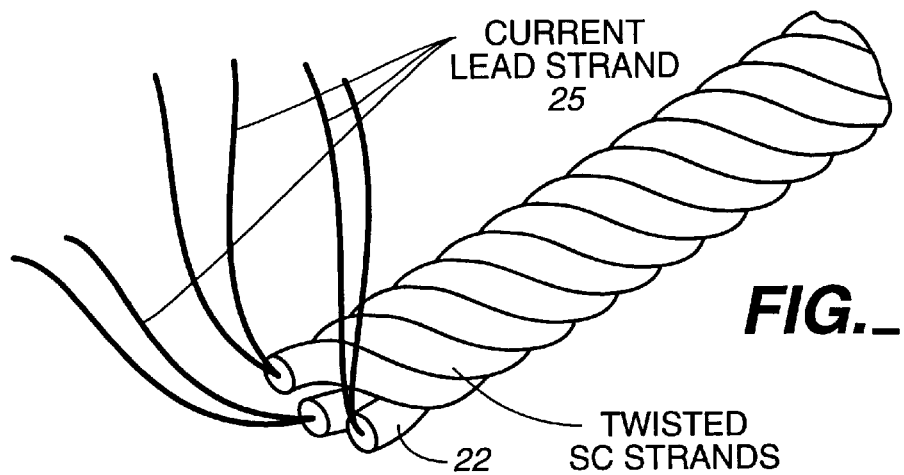
FIG._10A
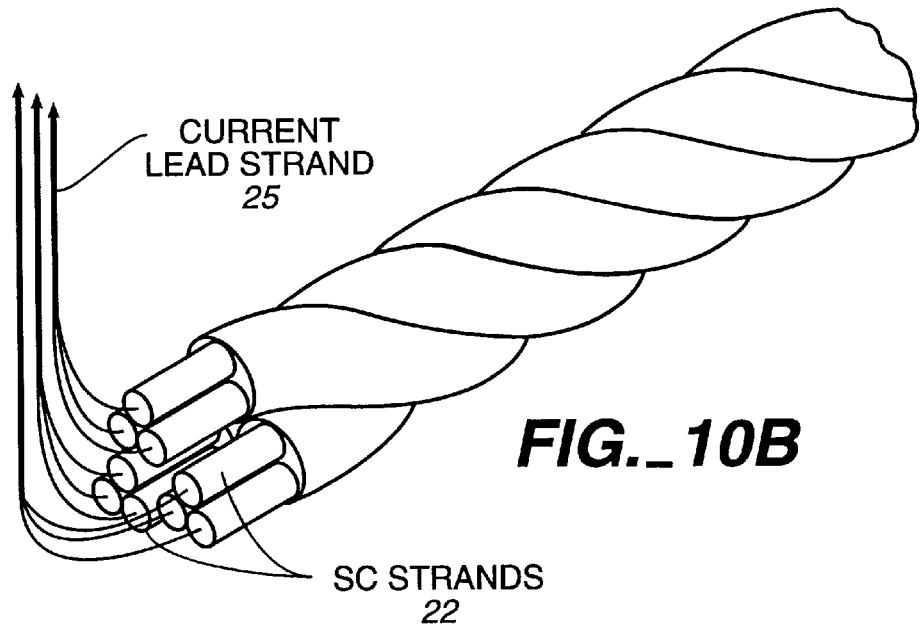
FIG._10B

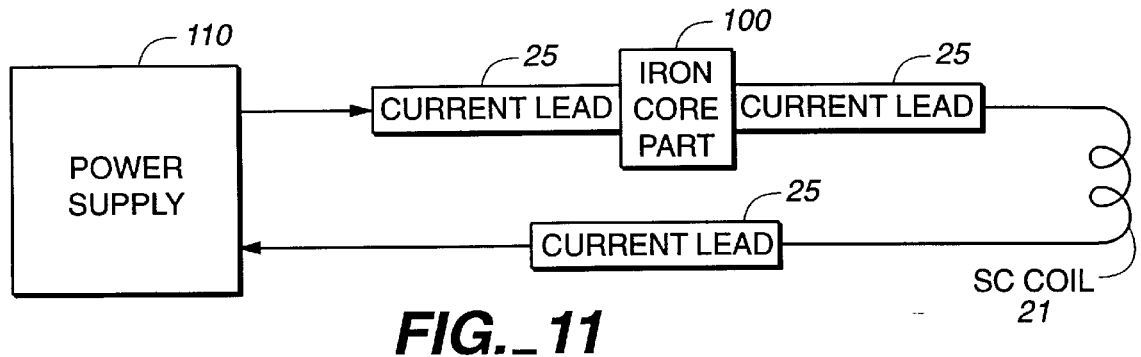
FIG._11
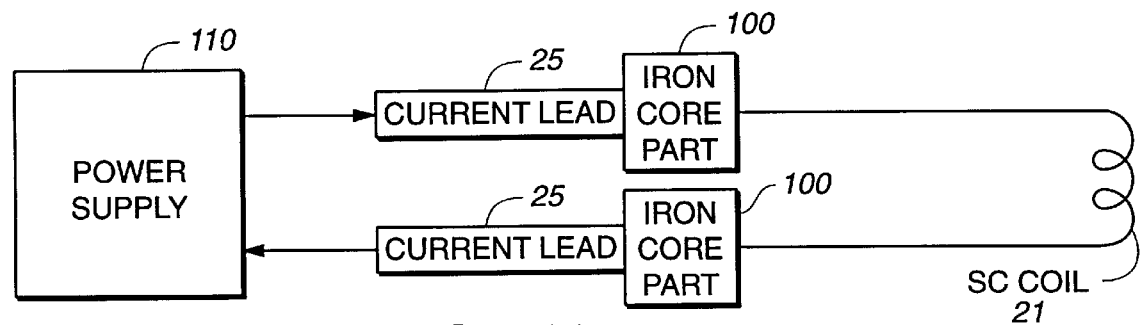
FIG._12
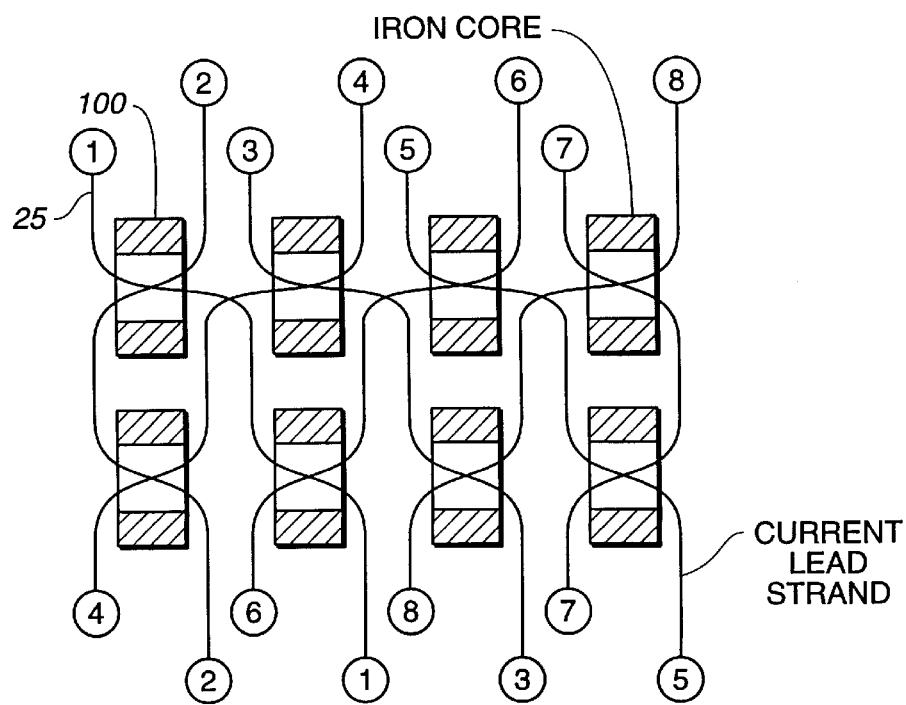
FIG._13

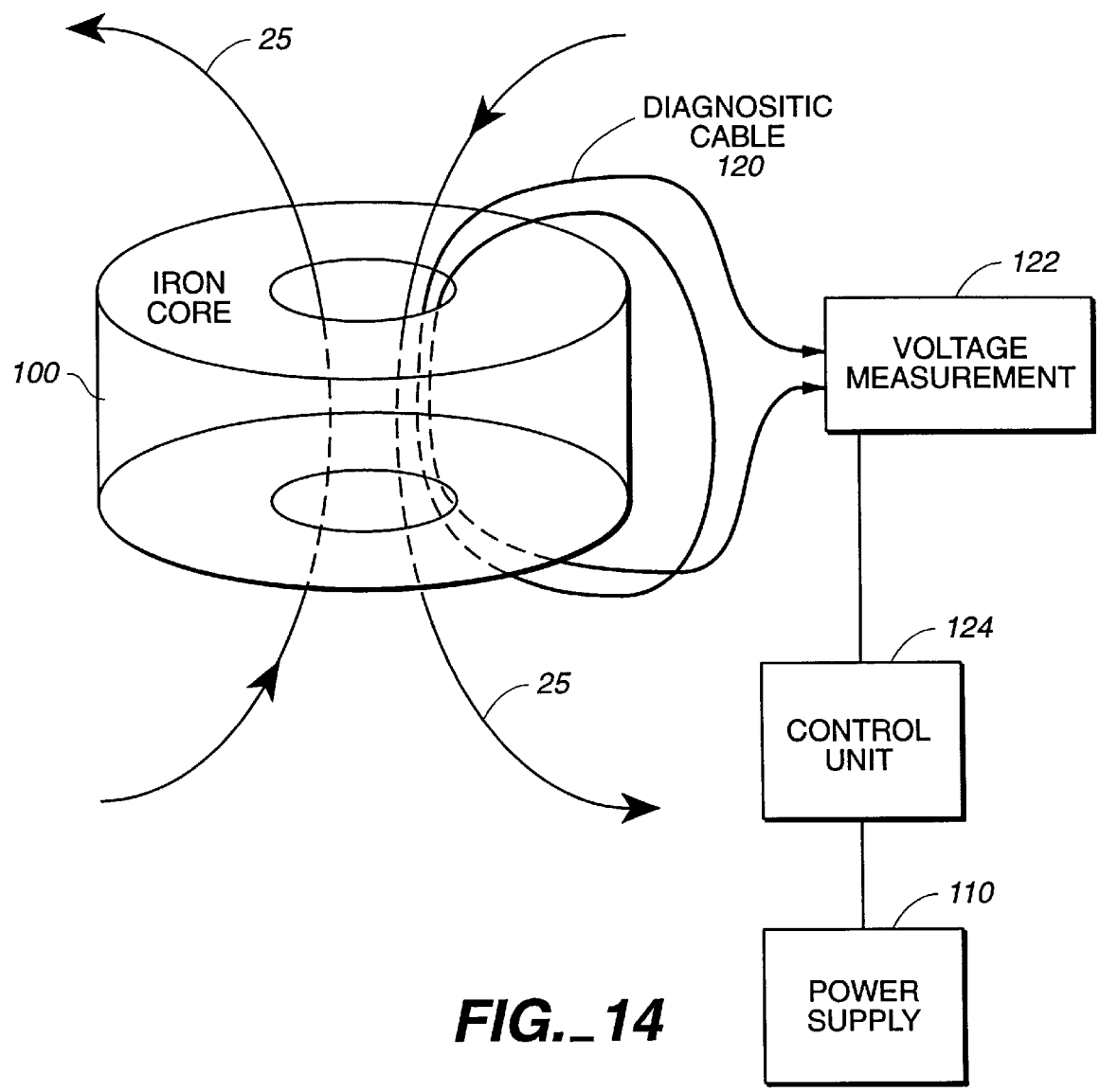
FIG._14

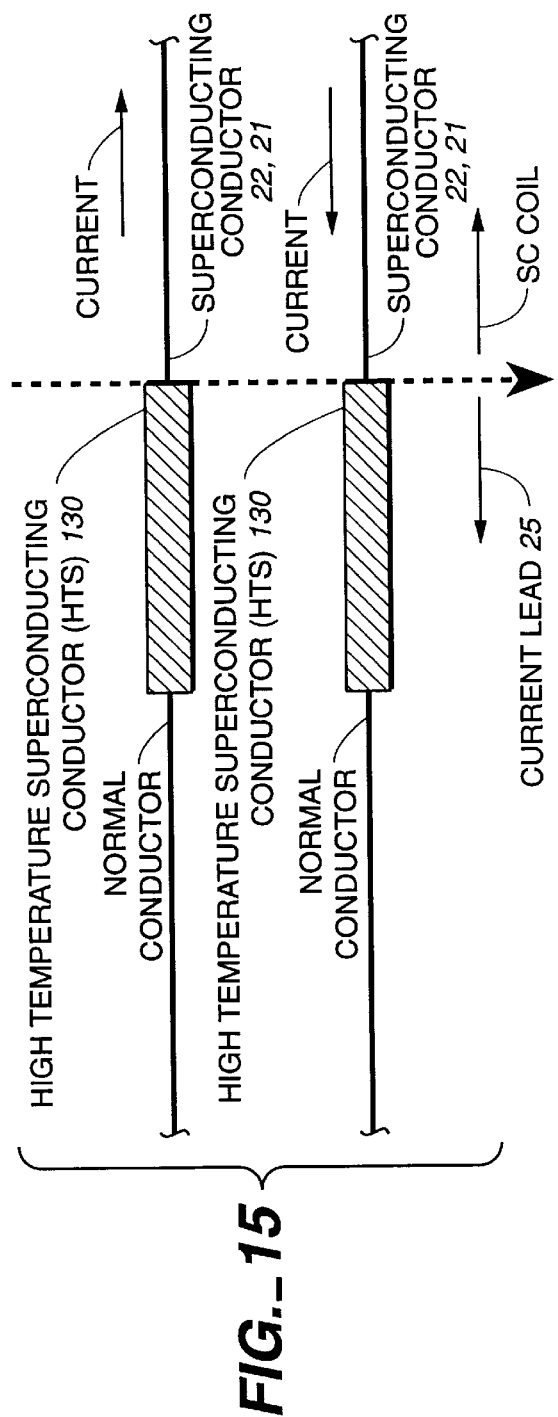
FIG._15
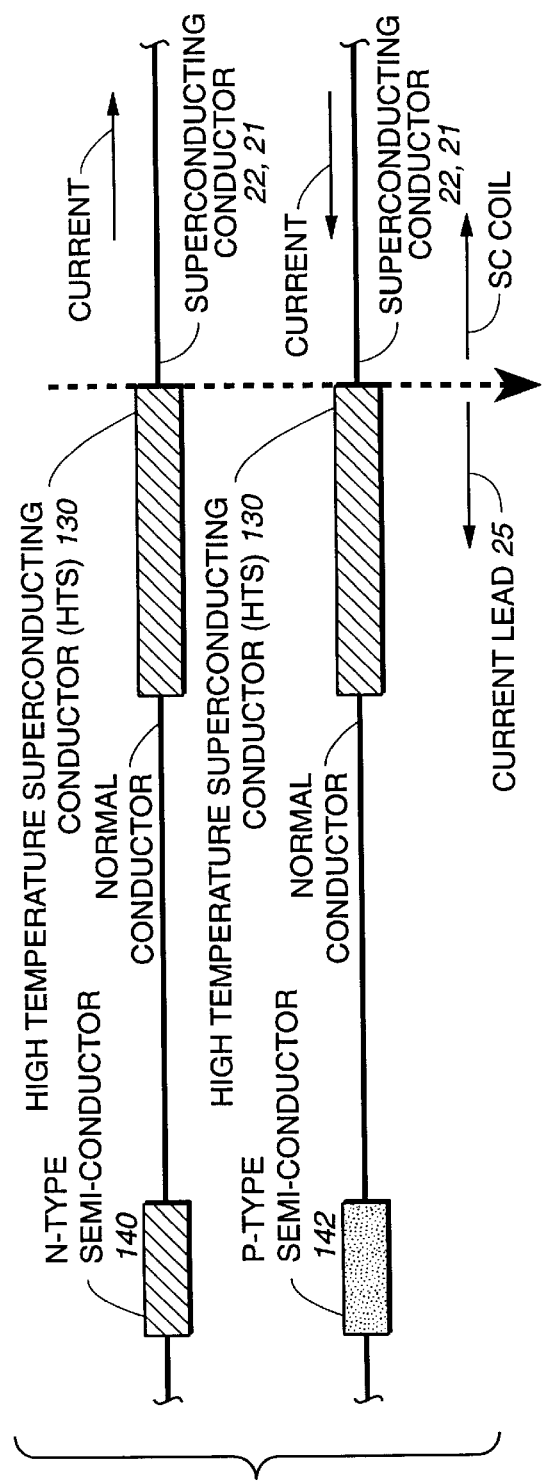
FIG._16

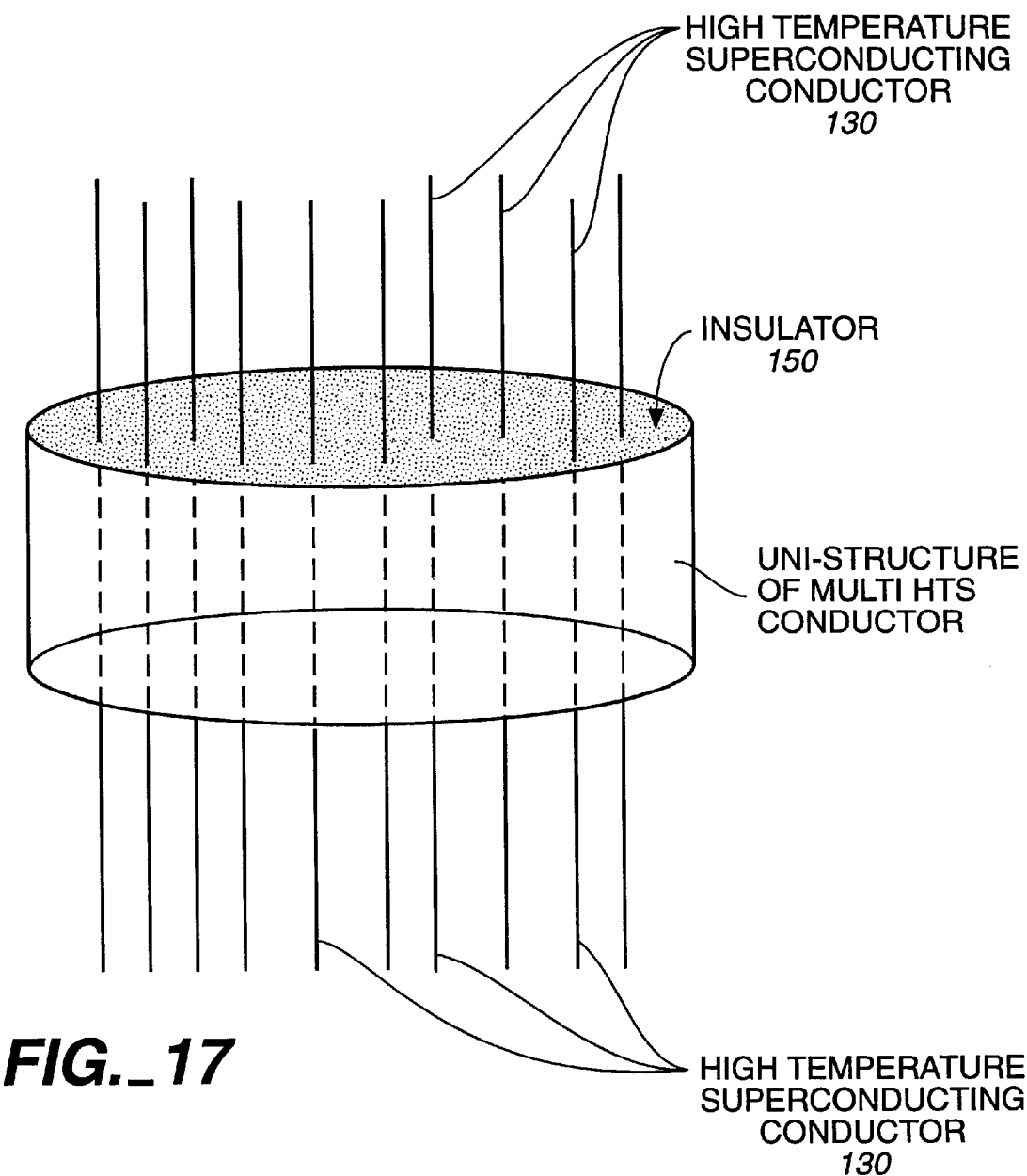
FIG._17

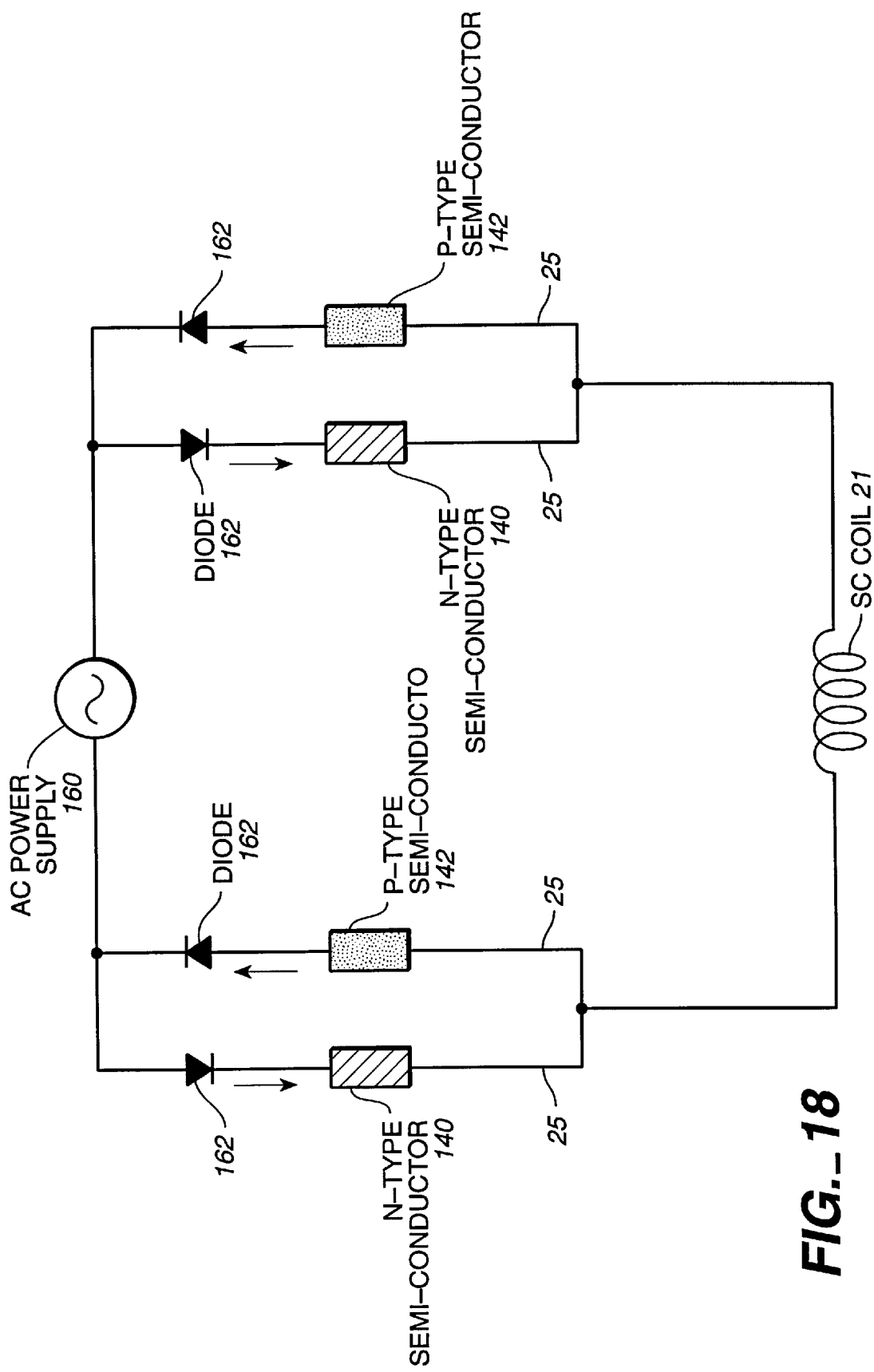
FIG._18

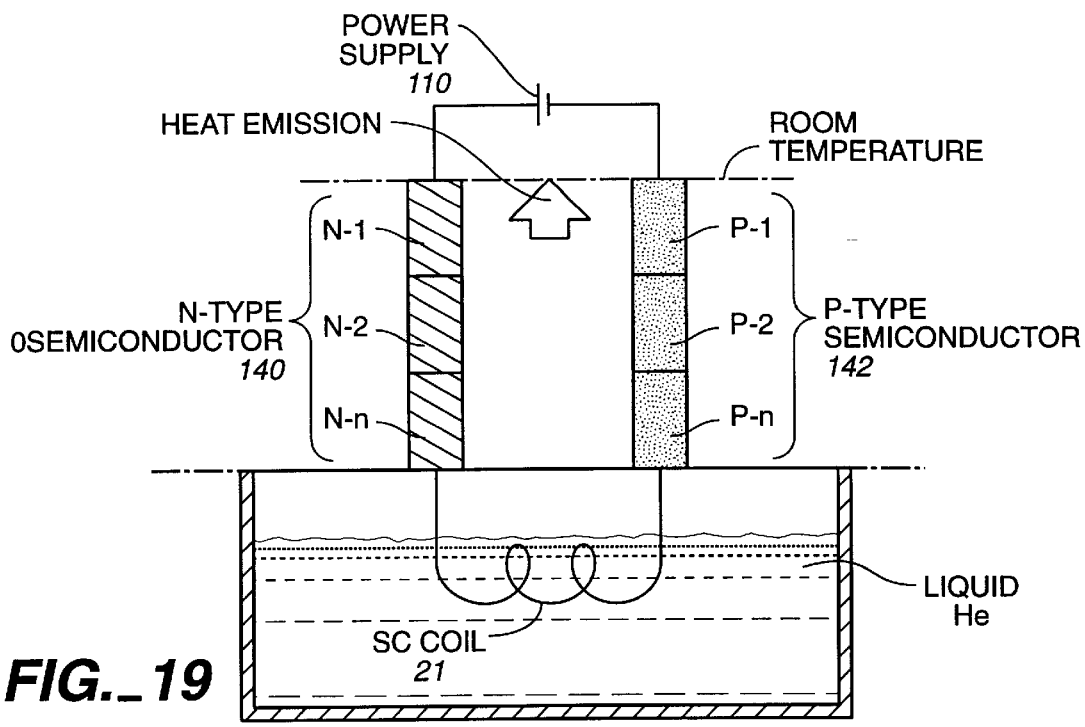
FIG._19
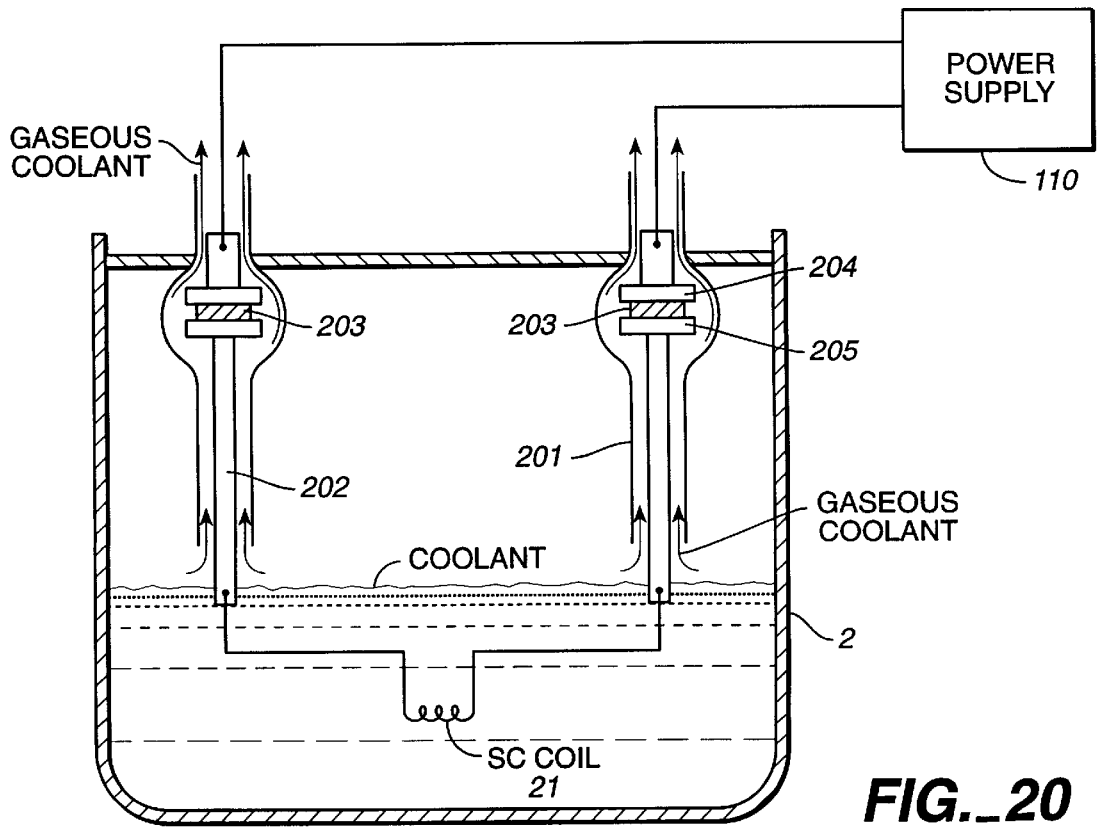
FIG._20

SUPERCONDUCTING SYSTEM

FIELD OF INVENTION

The present invention relates to a superconducting system, and more particularly to a structure and system for superconducting strands and current leads for improved current capacity.

BACKGROUND OF THE INVENTION

Superconducting systems employing superconducting cables and coils, especially cable-in-conduit cables (CCIC), are used in nuclear fusion experiments and superconducting magnet energy storage (SMES).

The interest is to design cables, which can also be fashioned into coils, to carry as large a current as possible. For example, the magnetic field from an electromagnet is a function of the current flowing in its coil.

Generally, the smaller the resistance in a conductor, the larger is its current capacity. Resistance can be reduced by having a conductor with a larger cross-section, and also by being in a superconducting state. However, at high frequencies, current tends to flow near the surface of a conductor and therefore the inner core is not utilized. Also, a thick solid conductor or cable is not easy to bend and is susceptible to breakage. Thus, it has been a standard design to use stranded cable of equivalent cross-section in place of a single solid cable. In fact superconducting systems have been built using individually insulated superconducting strands because of the above-mentioned considerations.

However, the insulated strands tend to carry the current unevenly under superconducting conditions in a phenomenon now identified as "strand channeling". This results in the current in some strands reaching the critical current much earlier than others so that quenching occurs prematurely. Thus a CCIC magnet is found to be quenched at a current much lower than its design value. In recent CICC magnets, the strands are not completely insulated, but their surfaces are coated by highly resistive material such as chromium. This allows some degree of current redistribution or shunting among strands.

FIG. 1 shows an example of a cross section of a conventional cable-in-conduit cable (CICC), referred to as "a CIC cable". In the cable-in-conduit cable shown in FIG. 1, several tens to several hundred superconducting strands are packed into a stainless-steel conduit (tubular structure).

The void ratio of a cable-in-conduit cable, which expresses the proportion of a cross section less the surface area of the strands, is commonly believed to be about 35 to 37%. (See, for example, Takahashi et al., "Effect of Chrome Plating on Connection Loss of Cable-in-Conduit Cable," Collected Preprints of $52^{nd}$ Meeting of Low-Temperature Engineering/Superconductivity Society, Fall of 1994 [Dai-52-kai, 1994 Nendo Shuki Teion Kogaku/Chodendo Gakkai Yokoshu], A3-6, p. 225

Electric current in a superconducting state is passed through such strands by cooling them to below the critical temperature using coolant such as liquid helium or supercritical helium. A conduit forms a helium channel in addition to functioning as a support against the enormous electromagnetic forces exerted on the cable.

FIG. 2 shows an example of a method for manufacturing such a CIC cable. In FIG. 2, the strand has a diameter of 0.76 mm and contains in its central portion embedded superconducting filaments consisting of copper and NbTi, $Nb_3Sn$, or the like. In the example, three strands are twisted into a single stranded wire, three such stranded wires are twisted into a single stranded wire, these operations are performed two more times, and six cables are finally placed in a conduit measuring 23.0×27.6 mm. Ultimately, 3×3×3×3×6=486 strands are used in the example shown in FIG. 2.

Several reasons exist for using a multitude of stranded wires. One reason is to reduce the AC loss. An eddy current flows near the conductor surface of an alternating-current circuit or a conductor in a magnetic field that varies over time. (This effect is called "the skin effect.") As shown in FIG. 2, because the strand surface is composed of copper, it is easier for the eddy current to flow near the strand surface, and heat is generated by the resistance of copper, adversely affecting the stability of the superconducting coil. Narrow strands are therefore used to reduce the eddy current loss. A design standard is given by Equation 1:

$$d < \delta \qquad (1)$$

where $\delta$ is the characteristic depth (penetration depth) of the skin effect, and d is the strand diameter. Such a narrow strand is well suited to being processed into a filament from NbTi or the like.

Another reason for twisting together several strands is that folding must be performed to obtain a cable that is to be used for coil formation. A failure to twist the strands will adversely affect bendability and will sometimes result in breakage. The coil being manufactured is commonly bent in a single direction. The coil will therefore have different lengths on in the inside and outside. If the strands were not twisted, they would be stretched on the outside and compressed on the inside. Stranding is performed in order to prevent any deterioration in the characteristics of a superconducting conductor based on such an asymmetric structure. A coil is fabricated by winding the CIC cables thus fabricated into a prescribed shape.

In order for stranding to minimize AC loss mentioned above, it is desirable to electrically insulate the strands from each other when an AC circuit or the like is used. The reason is that if the surfaces of a plurality of strands are electrically connected, the strands can be viewed as a single cable having a substantial surface area and volume, with the resulting increase in the eddy current loss W. The eddy current loss is proportional to the square of the characteristic strand diameter as given by the formula:

$$W \, d^2 \qquad (2)$$

where W is the eddy current loss, and d is the characteristic strand diameter. In practice, even a single strand has a multitude of contact sites, so the eddy current flows in a complex manner.

In the experiments for demonstration poloidal coils (DPCs) by the Japan Atomic Energy Research Institute (JAERI), owing to the aforementioned reasons, various strands are insulated with formvar during the fabrication of NbTi-30 kA class coils (DPC-U) with CIC cables. Specifically, the insulator formvar is applied in a thickness of several micrometers to the surface of the strand shown in FIG. 2 (see FIG. 3). In other words, complete inter-strand insulation is ensured by the coating of the strand surface with the insulator as shown in FIG. 3. Thus a structure with individually insulated superconducting strands has been implemented in the DPC experiments in order to obtain a stabilized superconducting coil with a low AC loss (in addition to the eddy current loss, the losses sustained by superconducting coils used in AC circuits include the hysteresis loss, proximity effect, and the like, but the eddy current loss is usually predominant).

The original intent of the JAERI's DPC project was to establish a world record with respect to the rate of change of the magnetic field dB/dt, and to enable the coil to ultimately be quenched at a much lower rate of change of the magnetic field dB/dt than that employed for a conventional coil. In practice, however, the DPC experiments performed by JAERI did not go as planned. The results demonstrated that the value of the rate of change of the magnetic field dB/dt at which such a superconducting coil could operate stably was about 1/1000 of the initial design value before quenching sets in.

The rate of change of the magnetic filed is measured by using pulsed current waveforms (see FIG. 4) prior to the passage of an AC current. Because of the separate excitation of the coil, the magnetic waveform generated by the coil resembles that in FIG. 4. It is therefore possible to determine the rate of change of the magnetic field dB/dt (time derivative of the magnetic field) during the time 0 to $t_1$. In the experiments, the time from 0 to $t_1$ and the $I_0$ value were controlled by an external power supply, and stability and other data concerning the superconducting coil were obtained by varying the rate of change of the magnetic field dB/dt.

The reasons for the disappointing DPC experiments were extensively researched by JAERI and by other scientific and manufacturing establishments, and it was discovered that it was due to the electric currents flowing through individual strands differed from each other and underwent significant channeling. The effect is that some strand will have more current bunched up in it and therefore exceed the critical current (i.e., current that demarcates between super- and normal-conducting states) more readily than others. This introduces instability to the overall cable system and initiates early quenching even though the average current in the strands is well below the critical current.

The following is an overall analysis of undesirable quenching due to current imbalance resulting from strands channeling.

FIG. 5 shows an equivalent circuit for a case in which two strands (for the sake of simplicity) are used. Strand 1 has self-inductance $L_1$ and resistance $R_1$, and strand 2 has $L_2$ as the self-inductance and $R_2$ the resistance, and M is the mutual inductance. The electrical network equations are given by Equations 3 and 4:

$$V = R_1 \cdot I_1 + j\omega L_1 \cdot *I_1 + j\omega M \cdot I_2 \quad (3)$$

$$V = R_2 \cdot I_2 + j\omega L_2 \cdot *I_2 + j\omega M \cdot I_1 \quad (4)$$

where $\omega$ is the oscillation frequency of the circuit, and j is an imaginary number such that $j^2 = -1$.

Solving Equations 3 and 4 above for the currents $I_1$ and $I_2$ will yield Equation 5:

$$I_1/I_2 = [R_2 + j\omega)(L_2 - M)]/[R_1 + j\omega(L_1 - M)]. \quad (5)$$

Because the strands in question are in a superconducting state, it can be assumed that $R_1 = R_2 = 0$ in Equation 5 above, in which case the current ratio of the two strands will be expressed by Equation 5' below.

$$I_1/I_2 = (L_2 - M)/(L_1 - M) \quad (5')$$

Two features lead to Equation 5' yielding greatly differing currents in two strands. One is that the mutual inductance M has a value that is very close to the self-impedance $L_1$ or $L_2$ because the strands have been wound closely to each other. The other is that the self-inductances $L_1$ and $L_2$ do not have identical values, but differ slightly from each other.

Measurement results obtained using JAERI's DPC indicate that self-inductance fluctuates by up to about 1% and that the mutual inductance is about 99% of the self-inductance. Substituting this result into Equation 5' above makes it possible to derive Equation 6 below.

$$I_1/I_2 = (101 - 99)/(100"99) = 2/1 \quad (6)$$

It is thus concluded that even a slight difference in impedance can result in an inter-strand current ratio of 2.

On the other hand, when the current in a strand exceeds a fixed value, namely, the critical current $I_c$, quenching will occur. With the unequal distribution of the current among the strands and the widely varying currents in the different strands, those strands bearing the higher current will exceed $I_c$ earlier than others. Specifically, quenching occurs in the aforementioned structure of JAERI's DPC when the current flowing through a number of strands (out of a total of 486 strands) exceeds $I_c$. This causes the entire coil to be quenched, with the result that the stably flowing electric current corresponds to a mere 1/1000 of the originally intended rate of change of the magnetic field dB/dt.

This phenomenon is still being extensively analyzed and researched, and results of this research have already been published in a variety of sources, some of which are cited below.

Ando et al., "Analysis of Channeling in Cases of Contact Points in Superconducting Stranded Cables for Alternating Currents/Pulses [Denryu/Parusu Yo Chodendo Yorisen Dotai no Naibu ni Sesshokuten ga Aru Toki no Henryu no Kaisetsu]," Collected Preprints of $52^{nd}$ Meeting of Low-Temperature Engineering/Superconductivity Society, Fall of 1994, E1-22, p. 229.

Koizumi et al., "Channeling Phenomena in 30 kA Class NbTi Cables [30 kA Kyu NbTi Dotai no Henryu Gensho]," Collected Preprints of $52^{nd}$ Meeting of Low-Temperature Engineering/Superconductivity Society, Fall of 1994, A3-10, p. 229.

Hida at al., "Quenching Characteristics of Passage of Alternating Currents Through Superconducting Stranded Cables for Alternating-Current Applications [Koryu Yo Chodendo Yorisen Dotai in Okeru Koryu Tsudenji no Kuenchi Tokusei ni Tsuite]," Collected Preprints of $52^{nd}$ Meeting of Low-Temperature Engineering/Superconductivity Society, Fall of 1994, A3-3, p. 222.

Of these, Koizumi et al. of JAERI indicated that, based on the coolant temperature dependence of the quenching current value, electric currents differing by as high as a factor of 7.1 of the average current value can flow through a plurality of strands. In addition, the disturbance of the self-inductance of a strand and the strand length have been estimated at 0.12% and 0.06%, respectively, in the case of a DPC-U cable.

One solution to reduce the uneven channeling of current among the strands is to relax the insulation of the strands. In this way, there will be some interstrand conduction that allows redistribution of the currents from one strand to others.

Based on the analysis results described above, recently manufactured CIC cables were chrome-plated rather than being insulated with formvar on the strand surface, as shown in FIG. 3. Because the strands are not completely insulated when the surfaces of these strands are chrome-plated, the eddy current loss increases, as was described in the beginning, but the loss is lower than in the case of a bare copper surface. This is because chromium has a lower electrical conductivity than copper.

Another mechanism for early quenching is when strand channeling causes the eddy current in some strands to exceed the critical current. Quenching commonly starts in portions containing such strands. Because voltage is generated by the resistance of the portion in which quenching was thus initiated, the electric current is reversed (that is, shunted) from the chrome-plated contact area to other elements.

FIG. 6 shows the manner in which the current is shunted by quenching in two strands. In FIG. 6, $R_1$ is the resistance based on the quenching generated as a result of the fact that the critical current $I_c$ has been exceeded, and $R_c$ is the contact resistance of the chrome plating. The electric current $I_1$ flowing through the strand 1 is shunted in the quench portion. The magnitude thereof is determined by the resistances $R_1$ and $R_c$, and the ratio of the current shunted to the strand 2 increases with an increase in the resistance $R_1$. Thus, current redistribution increases with $R_1$. In practice, this phenomenon involves numerous strands. Performing such shunting makes it possible for the strand current to be rendered uniform and for the coil to be operated stably.

Adopting such a structure, however, makes it necessary to examine the thickness of the chrome plating, the reversal of the eddy current in conformity with the thickness of the chrome plating, and the like, complicating the analysis and requiring experiments. Such studies are described, for example, in Takahashi et al., and Hida at al., and in the literature described below.

Tsuchioka et al., "Analysis of Channeling Between Strands in Cables [Keburu Dotai ni Okeru Sosenkan Henryu no Kaisetsu'," Collected Preprints of $52^{nd}$ Meeting of Low-Temperature Engineering/Superconductivity Society, Fall of 1994, E1-24, p. 121.

Ultimately, the main conclusion of this research was the realization that it is of utmost importance in the design technique of a CIC cable that while total insulation is provided in order to reduce the eddy current loss, but in view of strand channeling, chrome plating and the like for reducing the insulation are adjusted in accordance with the required coil specifications.

A comprehensive design technique for adjusting the chrome plating or the like in accordance with the required coil specifications has yet to be established, however.

The present inventor, in Japanese Patent Application 6-316071, tried to address the aforementioned problems and proposed a superconducting cable system in which a plurality of lead wires that form current leads are connected to the corresponding superconducting strands without being bundled together, as shown in FIG. 7.

Coils are often fabricated in the form of double pancakes, and many such pancakes are connected into a single coil. The double pancake cables of a poloidal coil in a large helical device (LHD) called a large superconducting coil have a length of about 170 m. The maximum length that should be adjusted is therefore about 0.102 m, as given by the formula 170×0.06%=0.102 m.

Formation of pronounced channeling can therefore be avoided by adopting a structure in which the length of a strand measuring about 10 cm can be adjusted in the connection area of each double pancake.

In FIG. 7, strands of varying length are connected to individual superconducting strands, and all the strands are attached together to a connector terminal. The superconducting coil is in a low-temperature environment, and the power supply thereof is at normal temperature. Connections can be completed using highly electroconductive copper, aluminum, or the like, but Joule heat and conduction of heat from the normal-temperature environment to the low-temperature environment are difficult to analyze. Devices called "current leads" are therefore used.

OBJECTS AND SUMMARY OF THE INVENTION

One object of the present invention is to provide a structure obtained by further improving the superconducting coil system proposed in Japanese Patent Application 6-316071 above.

Another object is to provide a superconducting system in which strand channeling is completely prevented and the cooling of the superconducting strands is stabilized.

Yet another object of the present invention is to provide a superconducting system in which the cooling characteristics of the current leads are improved.

Aimed at accomplishing these and additional objects, the present invention provides a superconducting system that includes a plurality of superconducting strands forming a superconducting cable; a power supply for supplying electric current to said, superconducting cable; and a plurality of current lead strands corresponding to said plurality of superconducting strands. The plurality of current lead strands individually insulated from each other and has a first end coupled to a terminating end of a corresponding superconducting strand and a second end coupled to said power supply. A first cooling environment is to maintain the superconducting cable in a superconducting state. A second cooling environment is to maintain at least a portion of the plurality of current lead strands in a regular conducting state such that a temperature-dependent resistance exists in each of the individual current lead strands. Means is provided for maintaining the resistance in each of the individual current lead strands within a predetermined range.

Essentially, series resistance is individually introduced to each superconducting strand so that the current ratio between two strands in Equation 5 is dominated by $I_1/I_2 \sim R_2/R_1$. Since $R_2 \sim R_1$, the current imbalance is not that great. This is accomplished by having the current lead also stranded and individually insulated and connecting to corresponding superconducting strands by means of individual connectors. The other end of the current leads is connected to a power supply that provides the current. This arrangement is inherently stable, because the current in each strand is self-limiting. If the current in one strand increases, the Joule loss ($I^2R$) will also increase, thereby raising the temperature. This will in turn increase the resistance R and automatically limit the current from increasing further. The superconducting strands are preferably maintained below the critical temperature as efficiently as possible, while portions of the current lead strands should be maintained in less than superconducting state to provide appreciable series resistance.

There are at least two advantages in using the regular conducting current lead strands to contribute resistance to the superconducting strands. First, resistance is not directly introduced into the superconducting strands as some prior art have suggested. Introducing residual resistance in the superconducting portion of a circuit is highly undesirable from a performance and engineering point of view. Secondly, with the resistance contributed from the regular conduction portion, the temperature sensitive resistance provides a current self-limiting mechanism. As the current in a strand rises, so does the temperature and therefore the resistance.

Since the current lead strands provide the necessary series resistance to the superconducting strands to forestall current imbalance and therefore premature quenching, it is therefore of critical importance that the resistance in the individual strand be regulated. This is accomplished by regulating the resistance in the individual current lead strands with careful temperature control.

Various aspects of the invention are directed to optimizing the cooling of the individual components of the superconducting system such as the coil/cable, the connectors, the stranded portion of the current leads and the power supply termination of the current leads. In this way, the current imbalance between the superconducting strands is mininized.

The present invention is also characterized by the fact that means is provided for controlling the flow rate of the gaseous helium used to cool the aforementioned current leads, and the voltage drop of the aforementioned current leads is kept essentially constant for each of the current leads.

Another characteristic feature is that the aforementioned supercritical helium is introduced from a heat exchanger inside the first tank filled with liquid helium to a tank for the aforementioned supercritical helium via a superconducting cable and a conduit for the aforementioned superconducting strands, and is returned from the aforementioned supercritical helium tank to the aforementioned heat exchanger.

Yet another characteristic feature of the present invention is that the aforementioned current leads are accommodated by a tubular member extended upward in the aforementioned liquid helium tank, one or more temperature sensors are installed near the inner wall of the aforementioned tubular member, and valves are provided for controlling the amount in which the gaseous helium produced by the evaporation of the liquid helium in the second tank escapes, based on the temperature measured by the aforementioned temperature sensors.

The present invention is also characterized by the fact that a heater is provided for heating the liquid helium inside the aforementioned second tank.

Another characteristic feature of the present invention is that a plurality of insulated current lead strands are used, and the aforementioned plurality of current leads are connected with the aid of connectors to a single such strand.

The present invention is also characterized by the fact that a plurality of insulated superconducting strands are used, and the aforementioned plurality of superconducting strands are connected with the aid of connectors to a single current lead.

Another characteristic feature of the present invention is to regulate the current in the current lead strands by means of threading a pair of strands carrying opposing currents through a magnetic. This will suppress current differentials in the pair. Thus, a hollow magnetic body is provided, allowing a pair of current leads obtained by the branching of said current lead strands to pass through the hollow portion in such a way that the electric current flows through the hollow magnetic body in mutually opposite directions.

The present invention is also characterized by the fact that current leads for electrically connecting a superconducting cable and a power supply for energizing this superconducting cable are not bundled together, but hollow magnetic bodies are provided both on the current source side and on the current sink side, allowing a pair of current leads obtained by the branching of said current leads to pass through the hollow portions in such a way that the electric current flows through the hollow magnetic body in mutually opposite directions.

Another characteristic feature of the present invention is that a measuring wire is wound around the aforementioned hollow magnetic bodies to measure the voltage across said measuring wire and to detect the deviation of the electric current in the current lead wires that pass through the aforementioned hollow portions.

The present invention is also characterized by inserting a high-temperature superconductor (HTS) between a current lead strand and a superconducting strand to provide a heat transfer barrier from the high-temperature power supply to the low-temperature superconducting cable.

Another characteristic feature of the present invention is that thermoelectric semiconductors are inserted into the current leads. They acts as a heat pump that helps to reduce the heat transfer from the high-temperature power supply to the low-temperature superconducting cable.

The present invention is also characterized by the fact that thermoelectric semiconductors are inserted into the current leads, high-temperature superconductors (HTS) are provided to the low-temperature portions of the aforementioned current leads, and these low-temperature portions are connected via said high-temperature superconductors (HTS) to the strands that constitute the superconducting cable.

Another characteristic feature of the present invention is that current leads for electrically connecting a superconducting cable and an alternating-current power supply for energizing this superconducting cable are not bundled together into an integral whole, thermoelectric semiconductors are inserted into the current leads via rectifying means, high-temperature superconductors (HTS) are provided to the low-temperature portions of the aforementioned current leads, and these low-temperature portions are connected via said high-temperature superconductors (HTS) to the strands that constitute the superconducting cable.

Still another characteristic feature of the present invention is that semiconductor elements obtained by connecting the two terminals on the high-temperature side and the low-temperature side to electrodes are inserted into current leads, and means are provided for cooling the electrodes on the aforementioned high-temperature side.

Still another characteristic feature of the present invention is the combination of the aforementioned cooling features.

The optimization of the cooling on the superconducting system, especially on the portion of current lead strands that contribute to the resistance is an important feature of the invention. For example, the high-temperature superconductors, the thermal electric semiconductors and other features mentioned all help to reduce heat transfer from the high-temperature side to the low-temperature side. This results in a lower heat transfer rate and also less thermal fluctuation among the portion of the current lead strands that contribute the resistance.

One aspect of the principle of the present invention will now be described in brief. The theoretical details of the present invention are disclosed in Japanese Patent Application 6-316071 mentioned above. According to the present invention, all the superconducting strands are electrically insulated from one another, reducing the eddy current loss, and the two methods described below are used to prevent the imbalance in the strand current (i.e., channeling) caused by the electrical insulation.

A) The self-inductance and the mutual inductance of each strand and strand pair are measured following coil manufacture, and an independent inductance component is joined to each strand to achieve balance.

B) A resistance component is introduced into each strand. The resistance at the end where electric current is introduced is used as such a resistance component.

As described above, the present invention provides a highly efficient superconducting system in which the superconducting strands are efficiently cooled, channeling in the current lead cables and superconducting strands is reduced, and less heat is absorbed by the current lead portion. The practical value of the system is very high.

A merit of the present invention is that the superconducting system can be energized and operated in a stable state of equilibrium by adopting a means for controlling the flow rate of gaseous helium in order to keep the voltage drop of the current lead portion constant.

Another merit of the present invention is that the formation of a regular conduction state in the superconducting cable can be monitored and detected by providing an iron core to the current leads.

Yet another merit of the present invention is that the absorption of heat on the low-temperature side from the current leads can be reduced with high efficiency and that the superconducting cable can be actuated with alternating current.

Additional objects, features and advantages of the present invention will be understood from the following description of the preferred embodiments, which description should be taken in conjunction with the accompanying drawings.

BRIEF DESCRIPTION OF THE DRAWINGS

FIG. 1 is a cross section illustrating the structure of a conventional cable-in-conduit cable.

FIG. 2 is a diagram illustrating the process for manufacturing a cable-in-conduit cable from strands.

FIG. 3 is a diagram depicting a structure obtained by coating the strand surface with an electrical insulator.

FIG. 4 is a diagram depicting an example of the waveform of an electric current signal passed through a strand.

FIG. 5 is a diagram depicting the equivalent circuit for a simplified model of two strands.

FIG. 6 is a diagram depicting the manner in which shunting occurs due to quenching in two strands.

FIG. 7 is a diagram depicting the structure of a double pancake and electrode.

FIG. 8 is a diagram designed to illustrate the superconducting system of an embodiment of the present invention.

FIG. 10 are diagrams depicting the manner in which current lead conductors and superconducting strands are connected in accordance with an embodiment of the present invention.

FIG. 11 is a diagram designed to illustrate the embodiment of the present invention in which the current lead conductors are provided with an iron core.

FIG. 12 is a diagram designed to illustrate the embodiment of the present invention in which the current lead conductors are provided with an iron core.

FIG. 13 is a diagram designed to illustrate the embodiment of the present invention in which the current leads are provided with an iron core.

FIG. 14 is a diagram designed to illustrate the embodiment of the present invention in which the iron core of the current leads is provided with a measuring wire.

FIG. 15 is a diagram designed to illustrate the embodiment of the present invention in which the current leads are provided with high-temperature superconductors (HTS).

FIG. 16 is a diagram designed to illustrate the embodiment of the present invention in which the current leads are provided with high-temperature superconductors (HTS) and thermoelectric semiconductor elements.

FIG. 17 is a diagram designed to illustrate the embodiment of the present invention in which the high-temperature superconductors (HTS) are integrated.

FIG. 18 is a diagram designed to illustrate the embodiment of the present invention in which the superconducting cable is energized by an alternating-current power supply.

FIG. 19 is a diagram designed to illustrate the embodiment of the present invention in which the structure of the thermoelectric semiconductors inserted into the current leads has been modified.

FIG. 20 is a diagram designed to illustrate an embodiment of the present invention.

DETAILED DESCRIPTION OF THE PREFERRED EMBODIMENTS

Figure 9:
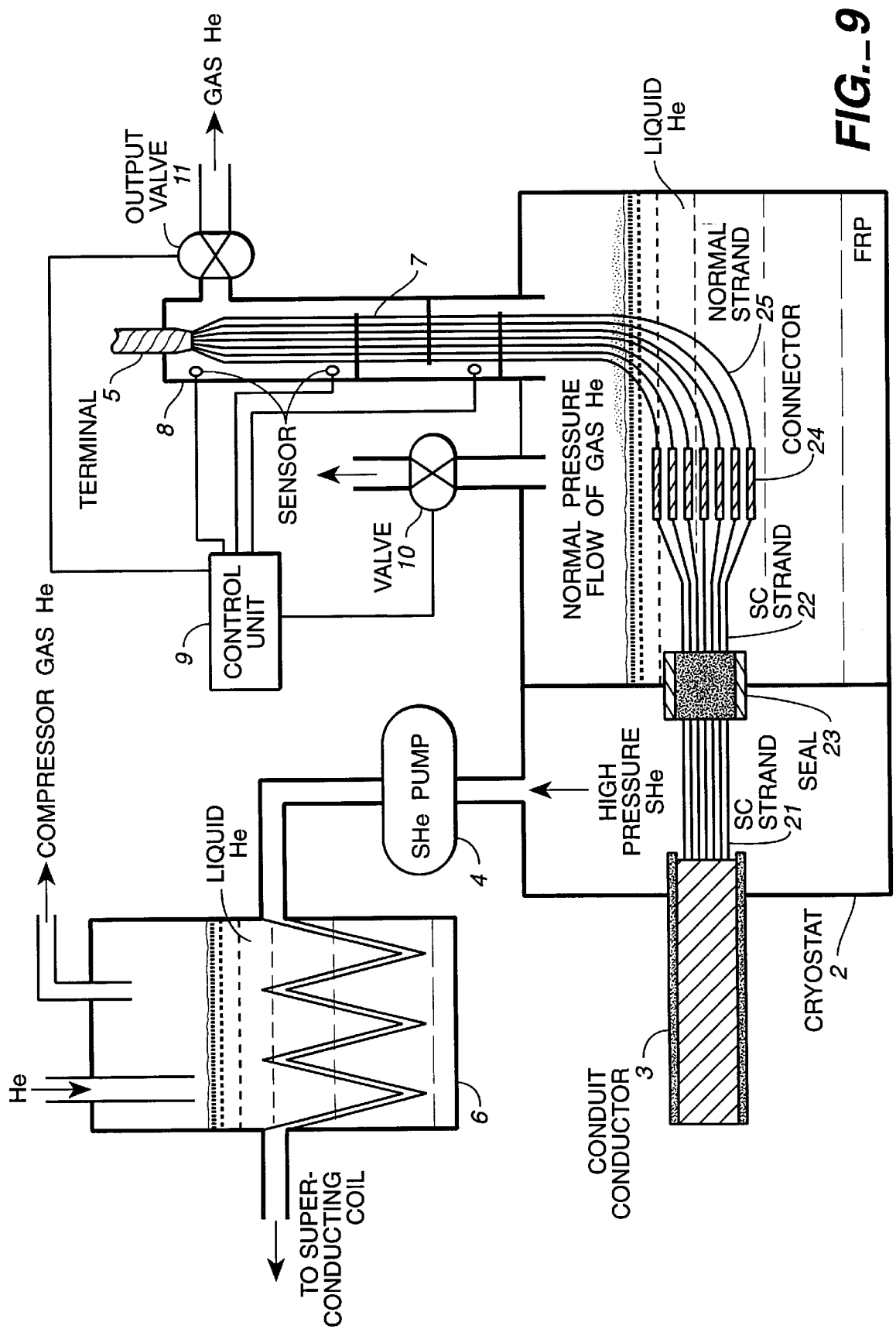
FIG. 9 is a diagram designed to illustrate the superconducting system of another embodiment of the present invention.

FIG. 8 is a diagram depicting the structure of the first embodiment of the present invention. Essentially, a superconducting cable or coil in the form of a plurality of strands (sc strands) 21 is powered by a power supply (not shown) through a power supply terminal 5. The connection from the superconducting cable to the power supply terminal 5 is by means of current leads 7 which is connected to the terminal 5 at a first end and to the sc strands 21 via a plurality of connectors 24 at a second end. The superconducting cable and the power supply are at two ends of a temperature range. The superconducting cable is maintained at a lower temperature of the range, at temperatures favorably to superconductivity. Whereas the power supply and the terminal 5 is at room temperature.

The superconducting cable constituted from the plurality of sc strands is accommodated by a cable conduit conductor and introduced into a first compartment of a cryostat 2. The first compartment provides the environment to maintain the sc strands in a superconducting state. In this embodiment it is a tank containing high-pressure supercritical helium (SHe). The supercritical helium is supplied into the pipe of a heat exchanger 6 with the aid of an SHe pump 4, and liquid helium is fed to the tank of the heat exchanger 6 (for example, pumped at a pressure of about 10 atm). Supercritical helium obtained by introducing the helium into the pipe is then resupplied to the superconducting coil side (not shown) to complete the cycle. A seal member 23 is provided to sealed airtight the first tank in order to maintain the high pressure therein.

The superconducting strands 21 terminate into a second compartment of the cryostat 2 where they become terminating sc strands 22 and are connected to the current leads 7. The second compartment provides the environment or a temperature buffer zone for transition from the low temperature superconducting environment on the sc strands end to the room temperature of the power supply end. In this embodiment it is a tank partially filled with liquid helium in which the sc strands are totally submerged while the current leads 7 are only partially submerged.

As mentioned before, an important feature in the termination of the sc strands is that the current leads 7 they are connected to also have a corresponding stranded portion, namely current lead strands 25. The sc strands 22 are connected on a one-to-one basis to the corresponding current lead strands 25 with the aid of connectors 24. The lead strands are insulated from each other. Current leads 7 composed of the lead strands 25 are accommodated by a tubular member extending upward through the top plate of the cryostat 2, and are connected to the terminal 5 connected to an outside power supply. The current leads 7 accommodated by the tubular member are cooled by the gasification of the liquid helium in the second tank.

Generally, when using liquid helium as a coolant, bubbles are formed following the generation of heat and the cooling effectiveness will be greatly diminished in the bubble-forming portions. In the embodiment of the present invention, however, helium is pressurized at an absolute temperature close to about 4 K, and the strands are cooled with a supercritical helium that does not separate into a liquid phase and a gas phase, whereby vapor does not form even when the temperature partially increases, with the result that the cooling capacity is not reduced significantly. The pressure is preferably about 10 atm.

An important feature underlying the invention is that a portion of the current lead strands is conducting regularly rather than under superconducting conditions. In this way, the series resistance is added from the regular conducting lead strands to the individual sc strands 21. This will avoid current imbalance or channeling among the sc strands as indicated by Equation 5 and the aforementioned discussion. There are at least two advantages in using the regular conducting current lead strands to add resistance to the sc strands. First, resistance is not directly introduced into the sc strands as some prior art have suggested. Introducing residual resistance in the superconducting portion of a circuit is highly undesirable from a performance and engineering point of view. Secondly, with the resistance contributed from the regular conduction portion, the temperature sensitive resistance provides a current self-limiting mechanism. As the current in a strand rises, so does the temperature and therefore the resistance.

Since the current lead strands provide the necessary series resistance to the sc strands to forestall current imbalance and therefore premature quenching, it is therefore of critical importance that the resistance in the individual strand be regulated. This is accomplished by regulating the resistance in the individual current lead strands with careful temperature control.

The current leads can be adequately cooled with liquid helium, and are therefore kept at atmospheric pressure (about 1 atm). Specifically, current leads are cooled with gaseous helium, less Joule heat is generated as a result of the fact that the electric resistance of the current leads is reduced as cooling progresses, the heat is dissipated outside or otherwise removed by being exchanged on the normal temperature side, and less heat is absorbed from the current leads. This arrangement provides a constant and stable temperature environment for the individual current lead strands whereby the electrical resistance therein are regulated.

Another feature of the embodiment of the present invention is the adoption of a connector joining structure that simplifies the connection of the superconducting strands and current lead strands.

FIG. 9 is a diagram depicting the structure of the second embodiment of the present invention. The second embodiment depicted (see FIG. 8) is provided with a means for controlling the flow rate of the gaseous helium used to cool the gas-cooled current leads, whereby the voltage drop across the terminals of the current leads is kept essentially constant for each of the lead strands that constitute the current leads. Specifically, a plurality of sensors 8, including a temperature sensor, a pressure gauge and/or a gas flowmeter and others, are installed inside the tubular member (see FIG. 9); the output of the sensors 8 is inputted to a control device 9; and the control device 9 controls the opening and closing and the aperture of valves 10 and 11 for controlling the discharge of the gaseous helium from the liquid helium tank of the cryostat 2 and the discharge of the gaseous helium that has cooled the current leads 7.

When too much gaseous helium flows around the current leads 7, overcooling occurs and the electric resistance decreases, and electric current balance is sometimes disrupted. The structure adopted in the second embodiment entails controlling the opening, closing, and other operations performed by the valves 10 and 11, and performing control in such a way that the resistance values of the current leads are kept constant based on pressure measurements for the current leads, temperature measurements, flow rate measurements for the gaseous helium, and combinations thereof.

In FIG. 9, pressure is controlled in such a way that the valve 10 opens when the pressure inside the cryostat 2 becomes too high, and overcooling occurs when gaseous helium is caused to flow around the current leads 7.

On the other hand, the superconducting coil side is in danger of being heated to a high temperature by the absorption of heat or the like when the evaporation of the liquid helium is low and the current leads 7 cannot be adequately cooled. To obviate this problem, it is possible to adopt a structure in which a heater (not shown) is installed inside the cryostat filled with liquid helium, and the system is heated to increase the amount in which gaseous helium is generated (evaporated), improving the cooling of the current leads 7. In this case, the heater can be enabled by the control device 9.

The connectors 24 shown in FIG. 9 are connected together and supported with the aid of FRP (fiber-reinforced plastic) or another insulating material.

Because the strands of a superconducting coil (superconducting strands) are bent in order to fabricate the coil, a stranded structure is adopted to reduce the flexural stress created during bending. As shown, for example, in FIG. 2, three strands are twisted together, three of the three-ply stranded wires are assembled and again twisted together, this operation is performed three times, and a cable obtained by bundling together six such strands is placed inside a conduit 3. When such a structure is obtained, the first three stranded wires have closely matching impedances and create virtually no channeling.

Whereas independently connecting all the strands to individual current lead strands significantly complicates the manufacturing process, strands with matching impedances can all be connected to a single current lead strand. This arrangement has a simpler structure.

Conversely, it is possible to adopt a system in which the number of the current lead strands is increased and the strands are connected to superconducting strands. This arrangement can also serve as a method for preventing electric current from undergoing channeling between the current lead strands.

FIG. 10A depicts a structure in which two strands from mutually insulated current leads are connected per superconducting stranded wire consisting of three stranded wires (a structure in which two current lead strands are used for each superconducting strand). This arrangement makes it possible to compensate for a certain imbalance in the current leads.

In FIG. 10B, three mutually insulating superconducting wires are connected in parallel to each current lead strand (three superconducting strands are used for each current lead strand). Each superconducting strand is obtained by twisting three stranded wires for a second time. In such a stranded wire structure, any cooling nonuniformity is compensated for, and channeling is suppressed.

FIG. 11 depicts the structure of the third embodiment of the present invention. An iron core acts as a magnetic choke by having a pair of strands carrying opposing currents threaded therethrough. In this way, the coke will resists any deviation from zero of the current sum, i.e., any deviation of the magnitude of the current in the two strands. In the third embodiment, the iron core is not positioned near the helium-temperature section of the superconducting coil but is at the current lead section, that is, at the high-temperature section. This arrangement enhances design flexibility and facilitates fabrication.

As is shown in FIG. 13, for example, 2n (Strand 1 through Strand 8) current lead strands form an array of two rows and n columns (for the sake of simplicity, n=4 in FIG. 13), passing through the hollow portions of the iron core in which the electric current flows in mutually opposite directions (twin arrangement). Assuming that the saturation magnetic flux $\phi_{max}$ of the iron core is $5.0 \times 10^{-4}$ VS, the difference $\Delta I_{AB}$ between the currents flowing through the two current leads that pass through the core can be assumed to be zero within the range of the coercive forces. Details on the structure in which the superconducting strands are equipped with an iron core, are disclosed in Japanese Patent Application 7-345678 filed by the present inventor.

It is also possible to separate the iron core (core portion) into two parts and to provide each current lead with a part of the iron core, as shown in FIG. 12. Such a structure is easier to fabricate.

In FIG. 14, a measuring wire is wound around the iron core in addition to the two current lead strands that pass through the iron core and that conduct electric current in mutually opposite directions, and the voltage generated in the measuring wire is measured. The electric currents flowing through the two current lead strands are equal to each other in magnitude, and no voltage is induced in the measuring wire (voltage is zero).

Meanwhile, the saturation of the iron core makes it possible to detect, by measuring the voltage of the measuring wire, any current imbalance or any occurrence in which a portion of a superconducting strand undergoes a phase transition from superconductivity to regular conduction. Specifically, the embodiment in question makes it possible to monitor and detect the transition of a superconducting strand to a state of regular conduction. When an increasing portion of a superconducting strand becomes regular-conducting, the power supply is controlled by a control device to reduce the current flow so as to operate the superconducting coil in a stable manner.

The fourth embodiment of the present invention will now be described. In FIG. 15, high-temperature superconductors (HTS) are connected to the low-temperature portions of current leads, and each have an electrically independent connection with a superconducting cable (superconducting strand). This arrangement reduces the absorption of heat on the low-temperature side. This is because HTS has relatively high electrically conductivity but relatively low thermal conductivity. Thus, HTS acts as a very effective heat shield while still passing current, unlike regular conductors.

In FIG. 16, thermally conductive semiconductors are connected in addition to high-temperature superconductors (HTS) to the current lead portion. Specifically, an n-type semiconductor is connected to the current inlet side of the current lead, a p-type semiconductor is connected to the current outlet side, and these thermoelectric semiconductor elements act as Peltier coolers, lowering the absorption of heat on the low-temperature side.

In FIG. 17, the plurality of high-temperature superconductors (HTS) depicted in FIGS. 15 and 16 are integrated in a mutually insulated state by the adoption of a structure in which these conductors are sealed with an insulating resin or the like in order to make it easier to connect the HTSs to a plurality of heat conductors used in coil applications. This arrangement improves productivity.

In the embodiment shown in FIG. 18, the power supply used is an alternating-current power supply for the alternating-current energizing of superconducting cables; two sets of thermoelectric semiconductors composed of n- and p-type thermoelectric semiconductors are connected to the corresponding current leads; a pair of diodes is inserted between the terminal on one side of the alternating-current power supply and the thermoelectric cooling element of the first group; a pair of diodes is inserted between the terminal on the other side of the alternating-current power supply and the thermoelectric cooling element of the second group; and the direction of the electric current flowing through the n- and p-type thermoelectric semiconductors is kept constant by the rectifying action of the diodes. Therefore, the thermoelectric semiconductor elements act as cooling elements (heat pumps). This arrangement reduces the absorption of heat on the low-temperature side.

In the embodiment shown in FIG. 19, the current leads are formed by connecting thermoelectric semiconductors composed of n- and p-type thermoelectric materials in a multi-stage cascade manner. In FIG. 19, the thermoelectric semiconductors of each stage are placed in different temperature regions, and heat is absorbed on the low-temperature side and dissipated on the high-temperature side. In the embodiment in question, it is expected that the difference between the maximum temperature and minimum temperature generated by the thermoelectric semiconductors of the plurality (n) of stages will be approximately equal to the sum of the cooling temperature differences $\Delta T_i$ (i=1 through n) created by the thermoelectric semiconductors. This arrangement enhances the cooling effect of the current leads.

Details concerning the various structures of the thermoelectric semiconductor elements and high-temperature superconductors (HTS) provided to current leads are disclosed in Japanese Patent Application 7-318600 filed by the present inventor. In other words, it is apparent that the various structures and modifications of the thermoelectric semiconductor elements and high-temperature superconductors (HTS) described in Japanese Patent Application 7-318600 mentioned above can also be applied to the superconducting system pertaining to the present invention.

In the embodiment depicted in FIG. 20, the superconducting coil is placed in liquid helium; and liquid helium (He) formed therein is allowed to flow through the gap between a current lead 202 (used to supply electric current to the superconducting coil from a power supply) and a cover 201 (used to enclose this current lead 202) and to escape into the atmosphere. In the process, less heat is absorbed by the low-temperature portion (on the liquid helium side) because of the heat exchange involving the generated Joule heat and the heat absorbed from the current lead 202. Such a structure, which has been used in the past, is referred to as "the gas cooling type of current lead."

In this embodiment, the absorption of heat by the low-temperature portion is reduced by adopting a structure in which a semiconductor 203 is introduced into the current lead 202 with the aid of electrodes 204 and 205, and is allowed to operate as a heat pump. At this time, the semiconductor 203 transfers heat from the low-temperature side (liquid helium side) to the high-temperature side (atmosphere side) by thermoelectricity. There are two types of transfer: Joule heat evolution and heat conduction caused by the temperature difference. The temperature will therefore increase for the electrode 204, which is connected to the high-temperature side of the semiconductor 203. This increase causes the temperature of the electrode 205 on the low-temperature side of the semiconductor to increase as well, and more heat is thus absorbed by the low-temperature portion.

Aimed at addressing this problem, the embodiment in question entails passing helium gas through the electrode 204 on the high-temperature side of the semiconductor to effect cooling.

While the embodiments of the various aspects of the present invention that have been described are the preferred implementations, those skilled in the art will understand that variation thereof may also be possible. Therefore, the invention is entitled to protection within the full scope of the appended claims.

It is claimed:

1. A superconducting system comprising:
   a plurality of superconducting strands forming a superconducting cable;
   a power supply for supplying electric current to said superconducting cable;
   a plurality of current lead strands corresponding to said plurality of superconducting strands, said plurality of current lead strands individually insulated from each other and having a first end coupled to a terminating end of a corresponding superconducting strand and a second end coupled to said power supply;
   a first cooling environment for maintaining said superconducting cable in a superconducting state;
   a second cooling environment for maintaining at least a portion of said plurality of current lead strands in a regular conducting state such that a temperature-dependent resistance exists in each of the individual current lead strands; and
   means for maintaining the resistance in each of the individual current lead strands within a predetermined range.

2. A superconducting system as in claim 1, wherein said first cooling environment includes a first tank containing a first coolant in a critical phase state.

3. A superconducting system as in claim 2, wherein said first coolant include supercritical helium.

4. A superconducting system as in claim 1, wherein:
   said second cooling environment includes a first cooling zone for cooling said portion of said plurality of current lead strands in a regular conducting state.

5. A superconducting system as in claim 4, wherein:
   said second cooling environment contains a liquid coolant; and
   said first cooling zone of said second cooling environment contains cooling vapor produced from vaporization of said liquid coolant.

6. A superconducting system as in claim 5, wherein said liquid coolant includes liquid helium.

7. A superconducting system as in claim 5, further comprising a heater in said second cooling environment for facilitating the vaporization of said liquid coolant.

8. A superconducting system as in claim 7, wherein said control means includes means for controlling the flow rate of said cooling vapor in the first cooling zone of said second cooling environment, thereby regulating the temperature therein.

9. A superconducting system as in claim 7, wherein said control means further comprises:
   an inlet valve for controlling vapor flowing into the first cooling zone;
   an outlet valve for controlling vapor flowing out of the first cooling zone;
   at least one temperature sensor for sensing the temperature in said first cooling zone; and
   a control unit responsive to the said at least one temperature sensor for controlling said heater and said inlet and outlet valves to regulate the flow rate of said cooling vapor in the first cooling zone of said second cooling environment, thereby regulating the temperature therein.

10. A superconducting system as in claim 1, further comprising:
    a plurality of connectors, individually for coupling the terminating end of a superconducting strand to the first end of a current lead strand.

11. A superconducting system as in claim 1, further comprising:
    a plurality of connectors, individually for coupling the terminating end of a superconducting strand to the first ends of more than one current lead strand.

12. A superconducting system as in claim 1, further comprising:
    a plurality of connectors, individually for coupling a current lead strand to the terminating ends of more than one superconducting strand.

13. A superconducting system as in claim 1, further comprising:
    a high-temperature superconductor (HTS) strand interconnecting between a superconducting strand and a current lead strand.

14. A superconducting system as in claim 1 or 13, further comprising:
    a thermal electric semiconductor inserted between a current lead strand and said power supply.

15. A superconducting system as in claim 14, wherein:
    a thermal electric semiconductor of the p-type is inserted between a current lead strand and said power supply when the current lead strand is carrying current in a first direction; and
    a thermal electric semiconductor of the n-type is inserted between a current lead strand and said power supply when the current lead strand is carrying current in a second direction opposite from the first current direction.

16. A superconducting system as in claim 15, wherein:
    a diode with a first polarity being insert additionally in series with said thermal electric semiconductor of the p-type; and a diode with a second polarity opposite to said first polarity being insert additionally in series with said thermal electric semiconductor of the n-type.

17. A superconducting system as in claim 14, wherein:
a plurality of thermoelectric semiconductors of the n- and p-types are connected in series in multiple stages.

18. A superconducting system as in claim 14, further comprising:
a plurality of semiconductor elements obtained by connecting the two terminals on the high-temperature side and the low-temperature side to electrodes are inserted into current lead strands, and means are provided for cooling the electrodes on the high-temperature side.

19. A superconducting system, as in claim 18, further comprising a cover that encircles said plurality of current lead strands in their longitudinal directions, for containing the cooling vapor therein.

* * * * *